United States Patent [19]
Knapp

[11] 3,943,970
[45] Mar. 16, 1976

[54] SINGLE CONTROL MIXING VALVE WITH AN AUXILIARY MEMBER CARRYING THE SEALING SEAT

[76] Inventor: Alfons Knapp, Bleicherstrasse 3, Biberach an der Riss, Germany

[22] Filed: Apr. 15, 1974

[21] Appl. No.: 461,098

[30] Foreign Application Priority Data
May 11, 1973 Italy.................................. 68344/73

[52] U.S. Cl............................. 137/597; 137/625.17
[51] Int. Cl.²............................................. F16K 11/22
[58] Field of Search . 137/610, 597, 614.16, 625.17, 137/636.2, 636.4, 637, 637.2–637.5, 454.2, 454.5, 454.6, 605, 625.41

[56] References Cited
UNITED STATES PATENTS

| | | | |
|---|---|---|---|
| 2,800,923 | 7/1957 | Russell | 137/607 X |
| 2,847,027 | 8/1958 | Kumpman | 137/636.2 X |
| 2,870,790 | 1/1959 | Jordan | 137/625.17 X |
| 2,987,079 | 6/1961 | Page | 137/625.41 X |

FOREIGN PATENTS OR APPLICATIONS
927,003  5/1963  United Kingdom........... 137/625.17

*Primary Examiner*—Martin P. Schwadron
*Assistant Examiner*—Richard Gerard
*Attorney, Agent, or Firm*—Young & Thompson

[57] ABSTRACT

A single control mixing valve of the type wherein a rotatable and axially movable plug controls both the mixing ratio and the delivered rate in cooperation with inlet ports and a sealing seat, wherein the sealing seat is formed on an auxiliary element in the form of a bush, machined separately from the body of the valve and sealingly inserted therein.

1 Claim, 3 Drawing Figures

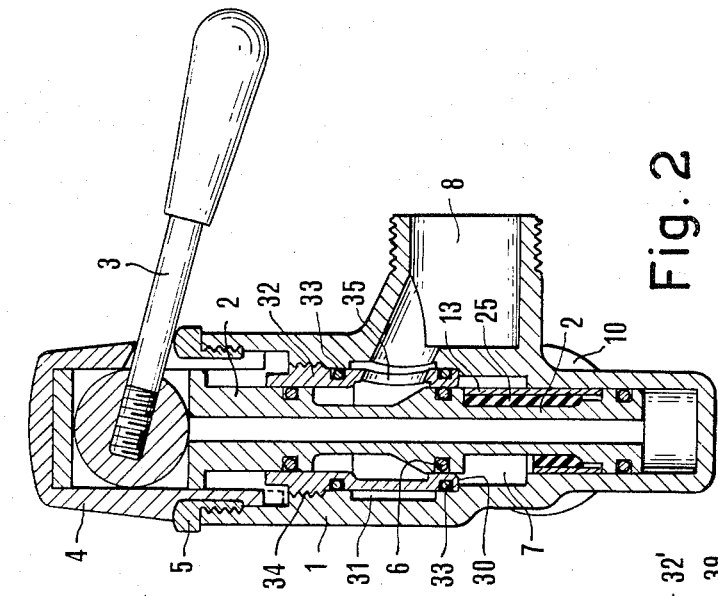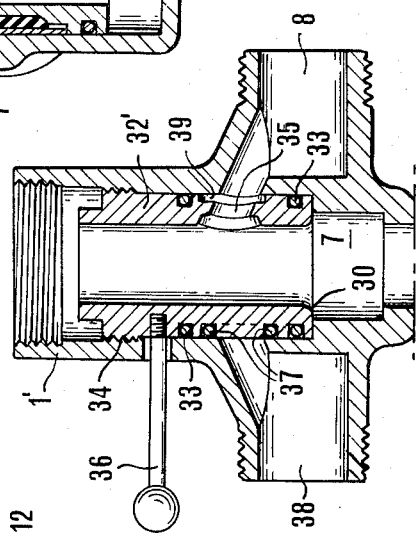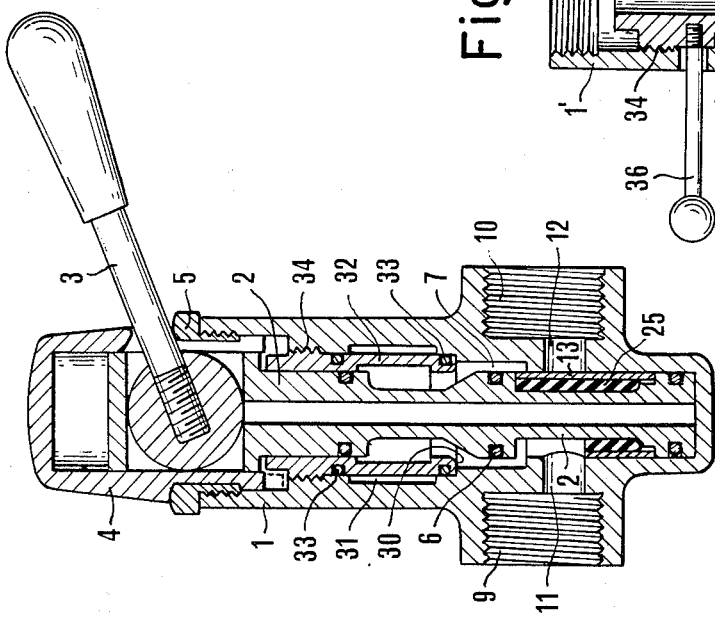
Fig. 1
Fig. 2
Fig. 3

SINGLE CONTROL MIXING VALVE WITH AN AUXILIARY MEMBER CARRYING THE SEALING SEAT

BACKGROUND OF THE INVENTION

This invention relates to a single-control mixing valve in which the sealing seat, instead of being provided directly in the body of the valve, is arranged on an auxiliary member.

In the single-control mixing valves, in which the delivered rate and the mixing ratios of hot and cold water are controlled by a plug which is rotatable and axially movable in the body of the valve, there arises the problem of the considerable resistance opposed by the friction to the movement of the plug, which resistance restrains the control and must therefore be reduced as far as possible. To this end, it is suitable that the plug itself have a reduced diameter, but on the other hand this provision generates serious problems in machining the inner cavity of the body of the valve, especially when said cavity has undercuts formed therein, because the automatic machines do not allow one to suitably use long and thin cantilevered tools. Especially when the sealing seat of the valve is intended to be closed by a gasket which approaches the seat from the inside of the valve towards the outside, the exact machining of said seat, which must be rounded and free from any imperfection, is very difficult. Moreover, repairs of the seat in case of deterioration thereof are absolutely impossible.

BRIEF SUMMARY OF THE INVENTION

It is the main object of this invention to render more easy the machining of the inner cavity of a single-control mixing valve having a plug of a reduced diameter, and this with special regard to the sealing seat. Another object of the invention is to allow the effectuation of repairs of a valve whose sealing seat has been damaged, thereby avoiding the necessity of replacing the valve body, which often is immured.

These objects are attained according to the invention by the fact that the sealing seat, and eventually also other portions of the valve cavity which are arranged to cooperate with the plug, are provided on an auxiliary member shaped as a bush, which in turn is inserted sealingly into the cavity of the body of the valve.

It is clear that the bush, which can be machined separately from the body of the valve before being inserted therein, does not present any machining difficulties, whereas on the other hand the cavity of the valve body, instead of being proportionated to the diameter of the plug, is proportionated to the outer diameter of the bush, which diameter may be chosen such as to facilitate the machining of the cavity of the body. Furthermore, the bush can be inserted demountably into the body of the valve, so that its extraction, when damaged, for repair purposes or even for replacement by a new bush, can be effected without having to demount the body of the valve.

In a possible further development of the invention, said bush is inserted rotatably into the body of the valve and is provided with a drive means in order to confer on it also the function of a diverter for directing the flow in the valve towards at least two different ways, as for instance a delivery spout and a hose, or the like.

BRIEF DESCRIPTION OF THE DRAWING

The annexed drawing diagrammatically shows two illustrative and not restrictive embodiments of mixing valves according to this invention. Therein:

FIG. 1 is an axial and diametral sectional elevation of a first embodiment of the valve according to the invention, the section being made through the inlet ducts of the liquids to be mixed, FIG. 2 is a sectional elevation of the valve shown in FIG. 1, the section being made through the outlet duct for the liquid and with the control members shown in a different position, and FIG. 3 a partial sectional elevation of a second embodiment, in which the inner bush also acts as a diverter.

DETAILED DESCRIPTION OF THE PREFERRED EMBODIMENTS

The mixing valve shown in FIGS. 1 and 2 comprises a body 1 in which a plug 2 is mounted which is axially movable and rotatable and whose rotation and axial translation movements are controlled by means of a lever 3 pivoted in a rotatable but axially immovable hood 4 mounted on the body 1 by means of a ring 5. The plug 2 is provided with a gasket 6 arranged to cooperate with a seating 30 in order to intercept the fluid and regulate its flow.

The body 1 is formed with an outlet duct 8 which communicates with the inner chamber 7 of the body 1 when the gasket 6 is in its opening position. The body 1 is also provided with inlet ducts 9 and 10 which communicate through openings 11 and 12 with the inner chamber 7, under the control of a distributing member formed with a portion which has the shape of an interrupted lamellar skirt 13, said portion being carried by the plug 2 and resiliently backed by a filling of elastic material 25 inserted between the skirt 13 and the plug 2. As can be appreciated, the axial movements of the plug 2 regulate the delivered rate, whereas the rotations of the plug about its own axis regulate the mixing ratios.

Since the plug 2 has a small diameter, it is obvious that it would be difficult to machine the inner cavity of the body 1 at those portions of the cavity which are not merely a cylindrical surface of a constant diameter and free of undercuts; particularly, it would be very difficult to machine the sealing seat 30 and the cavity 31 with which the outlet duct 8 communicates.

According to the invention this disadvantage has been eliminated by arranging the seating 30 at the inner end of a bush 32 which constitutes an auxiliary element which can be inserted sealingly by means of gaskets 33 into the body 1 and fixed therein, for example, by means of a thread 34. The inner cavity of the bush 32 is machined to cooperate with the plug 2 and is formed with a more or less radial opening 35 which allows the water to pass towards the cavity 31 and the delivery duct 8. It is clear that the machining of the bush 32 does not present any problem, while the problem of the inner machining of the body 1 is substantially reduced because of the larger diameter of the opening of its cavity which is now adapted to contain the bush 32 instead of the small plug 2. Moreover, in case some part, for example, the seating 30, is damaged during the machining, only the bush 32, and not the entire body, has to be scrapped, whereas in case of a defect arising after the assembly, for example in case of the seating 30 being scored by foreign matters carried by the water, as well as in case of wear-out, it is sufficient to remove the bush 32 and to subject it to a new machining or to replace the same by a new one, thereby avoiding the necessity of detaching the body 1 from the installation, which body often is incorporated in a wall or is demountable with difficulty for some other reasons.

The embodiment shown in FIG. 3 relates to a valve intended to feed at will two or more delivery lines, for example the spout or the flexible fitting of a washbowl, the spout or the shower of a bath tub, or the like. In this case, the valve is provided with two delivery ducts 8 and 38, which are shown as diametrically opposed but of course could be disposed at any angle to each other. In this embodiment, the bush 32' is not screwed completely into the body 1' but may rotate through a small angle, and its rotation is controllable by means of a lever 36 passing through a corresponding slot formed in the body 1'. Besides the passage opening 35, the bush 32' has also an annular gasket 37 which acts to close the duct 38 or, when the bush is rotated by means of the lever 36, the duct 8, while the duct which is not closed by the gasket 37 is fed by the opening 35 directly or through an annular recess 39 of the bush (which recess replaces the chamber 31 of the first embodiment). Of course, it is possible to reduce the angle of rotation to be imparted to the bush for the diversion by providing, if necessary, two gaskets 37 shifted with respect to each other and intended to close respectively the one or the other of the delivery ducts; also, the openings 35 may be more than one, although both in this and the preceding embodiment it is not necessary to have the opening 35 confronting the delivery duct which is being fed.

Of course, the invention is not restricted to the specific embodiments shown and described herein and can be realized in somewhat different forms adapted to the requirements of the various applications.

Having thus thus described my invention, what I claim is:

1. A single control mixing valve comprising a body, in said body inlet ports for fluids to be mixed and an inner mixing chamber and two outlet ports for mixed fluid, a rotatable and axially movable plug in said body and cooperating with said inlet ports to control the mixing ratio of the fluids flowing from said inlet ports to said inner mixing chamber, a sealing gasket on said plug, and an auxiliary member sealingly inserted between said body and said plug and connected to said body independently from said plug, said auxiliary member having the shape of a bush with a substantially cylindrical inner wall and being traversed by an opening interconnecting said inner mixing chamber selectively with either of said outlet ports, the inner end of said auxiliary member having a sealing seat cooperating with said sealing gasket of the plug to control the flow rate of the mixed fluid flowing from said inner mixing chamber to said outlet ports of the body, said auxiliary member having the sealing seat being mounted within said body for rotation through at least a limited angle between a first position in which said opening communicates with one said outlet port and a second position in which said opening communicates with the other said outlet port, a control lever connected to said auxiliary member to rotate said auxiliary member, said auxiliary member further having a closing gasket carried thereby that seals between said auxiliary member and said body entirely about said other outlet port in said first position of said auxiliary member and that seals between said auxiliary member and said body entirely about said one outlet port in said second position of said auxiliary member, whereby said auxiliary member also acts as a flow diverter.

* * * * *